US008339682B2

(12) United States Patent
Kawamura et al.

(10) Patent No.: US 8,339,682 B2
(45) Date of Patent: *Dec. 25, 2012

(54) LIGHTING DEVICE FOR USE IN AN OPTICAL SCANNING UNIT, OF AN IMAGE READER

(75) Inventors: Kazushige Kawamura, Tokyo (JP); Tetsuya Fujioka, Yokohama (JP); Yasuo Sakurai, Yokohama (JP); Yasunobu Youda, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 698 days.

This patent is subject to a terminal disclaimer.

(21) Appl. No.: 12/457,276

(22) Filed: Jun. 5, 2009

(65) Prior Publication Data

US 2009/0316224 A1 Dec. 24, 2009

(30) Foreign Application Priority Data

Jun. 20, 2008 (JP) .................................. 2008-162025

(51) Int. Cl.
*H04N 1/04* (2006.01)

(52) U.S. Cl. ........ 358/474; 358/475; 358/509; 399/162; 399/407

(58) Field of Classification Search .................. 358/474, 358/497, 486, 475, 509; 399/162, 407, 43, 399/124, 258, 107
See application file for complete search history.

(56) References Cited

U.S. PATENT DOCUMENTS

| | | | | | |
|---|---|---|---|---|---|
| 2,891,720 | A | * | 6/1959 | Berke et al. .................. | 382/113 |
| 4,739,159 | A | * | 4/1988 | Inokuchi ...................... | 250/216 |
| 5,142,137 | A | * | 8/1992 | Kushino et al. ............. | 250/208.1 |
| 5,570,204 | A | * | 10/1996 | Kumashiro .................. | 358/471 |
| 5,717,500 | A | * | 2/1998 | Ikeda et al. .................. | 358/449 |
| 5,913,091 | A | * | 6/1999 | Nanba et al. ................. | 399/32 |
| 6,628,432 | B1 | * | 9/2003 | Oshima et al. ............... | 358/474 |
| 7,495,682 | B2 | * | 2/2009 | Kohchi et al. ............... | 347/115 |
| 7,688,483 | B2 | * | 3/2010 | Okada et al. ................. | 358/497 |

(Continued)

FOREIGN PATENT DOCUMENTS

JP 63-137340 9/1988

(Continued)

OTHER PUBLICATIONS

Japanese Office Action dated Dec. 27, 2011 for Application No. 2008-162025.

*Primary Examiner* — Negussie Worku
(74) *Attorney, Agent, or Firm* — Harness, Dickey & Pierce, P.L.C.

(57) ABSTRACT

In a lighting device, a light source emits light. A second sandwiching member includes a second opposed surface opposing a first opposed surface of a first sandwiching member. The first sandwiching member and the second sandwiching member sandwich the light source in such a manner that the light source is detachably attached to the first sandwiching member and the second sandwiching member. A reflection member is provided on the first opposed surface of the first sandwiching member and the second opposed surface of the second sandwiching member to reflect the light emitted by the light source toward an irradiation region on an original document sheet. A positioning member is provided in the first opposed surface of the first sandwiching member and the second opposed surface of the second sandwiching member to position the light source with respect to the reflection member.

20 Claims, 10 Drawing Sheets

U.S. PATENT DOCUMENTS

| | | | |
|---|---|---|---|
| 7,692,824 B2 * | 4/2010 | Shirai .......................... | 358/474 |
| 7,742,203 B2 * | 6/2010 | Sugiyama et al. ............ | 358/497 |
| 7,773,272 B2 * | 8/2010 | Shirai .......................... | 358/474 |
| 7,800,794 B2 * | 9/2010 | Ando ........................... | 358/474 |
| 7,924,475 B2 * | 4/2011 | Suzuki ......................... | 358/474 |
| 8,098,411 B2 * | 1/2012 | Iwago et al. ................. | 358/498 |
| 2006/0008295 A1 | 1/2006 | Kohchi et al. | |
| 2006/0279961 A1 | 12/2006 | Sakurai | |
| 2008/0180774 A1 | 7/2008 | Tatsuno | |
| 2011/0080626 A1 * | 4/2011 | Morikawa .................... | 358/509 |

FOREIGN PATENT DOCUMENTS

| | | |
|---|---|---|
| JP | 07-335016 | 12/1995 |
| JP | 09-307714 | 11/1997 |
| JP | 2001-083622 | 3/2001 |
| JP | 2001-230902 | 8/2001 |
| JP | 2003-158614 | 5/2003 |
| JP | 2006-025303 | 1/2006 |
| JP | 2007-078104 | 3/2007 |
| JP | 2007-221359 | 8/2007 |
| JP | 2007-221360 | 8/2007 |

* cited by examiner

LIGHTING DEVICE FOR USE IN AN OPTICAL SCANNING UNIT, OF AN IMAGE READER

PRIORITY STATEMENT

The present patent application claims priority from Japanese Patent Application No. 2008-162025, filed on Jun. 20, 2008, in the Japan Patent Office, the entire contents of which are hereby incorporated herein by reference.

BACKGROUND OF THE INVENTION

1. Field of the Invention

Example embodiments generally relate to a lighting device, an optical scanning unit, an image reader, and an image forming apparatus, and more particularly, to a lighting device for irradiating an original document sheet, an optical scanning unit, an image reader, and an image forming apparatus including the lighting device, for example.

2. Description of the Related Art

Related-art image forming apparatuses, such as copiers, facsimile machines, image scanners, or multifunction printers having at least one of copying, printing, scanning, and facsimile functions, typically form an image on a recording medium (e.g., a sheet) according to image data using electrophotography. Thus, for example, an image reader reads an image on an original document sheet to generate image data; a charger uniformly charges a surface of an image carrier; an optical writer emits a light beam onto the charged surface of the image carrier to form an electrostatic latent image on the image carrier according to the image data; a development device supplies toner particles to the electrostatic latent image formed on the image carrier to make the electrostatic latent image visible as a toner image; the toner image is directly transferred from the image carrier onto a sheet or is indirectly transferred from the image carrier onto a sheet via an intermediate transfer member; a cleaner then cleans the surface of the image carrier after the toner image is transferred from the image carrier onto the sheet; finally, a fixing device applies heat and pressure to the sheet bearing the toner image to fix the toner image on the sheet, thus forming the image on the sheet.

In such image forming apparatuses, the image reader may include a lighting device in which a light-emitting diode (LED) is used as a light source to provide quick warm-up, energy saving, and a long life of the light source.

However, the LED has a small light-emitting surface, roughly equivalent to a point source, and therefore does not provide uniform illuminance distribution in a sub-scanning direction. To address this problem, related-art lighting devices may include a guide member to guide light emitted by the LED.

Thus, for example, a related-art image reader may include a lighting device including a plurality of point sources, a guide member formed of transparent resin or glass, and a positioning member. The plurality of point sources is aligned so as to irradiate an original document sheet through an exposure glass, with the guide member guiding light emitted by the plurality of point sources to irradiate the original document sheet in a main scanning direction. The positioning member positions the plurality of point sources with respect to the guide member in such a manner that a constant gap is provided between the plurality of point sources and the guide member, and a direction in which the plurality of point sources is aligned corresponds to a longitudinal direction of the guide member.

However, some original documents present special problems. Thus, for example, when an open book or a thick sheet is placed on the exposure glass, a center portion of the open book lifted from the exposure glass, or a step formed between the thick sheet and the exposure glass, may result in a shaded image of the original.

To address this problem, some image readers include first and second lighting devices which include first and second light sources and first and second guide members for guiding light emitted by the first and second light sources to an original document sheet, respectively. The first lighting device is provided upstream from an irradiation region in which light emitted by the first light source irradiates the original document sheet in the sub-scanning direction, and the second lighting device is provided downstream from the irradiation region in the sub-scanning direction.

However, although such an arrangement can solve the problem described above, in such an image reader, the light sources need to be positioned precisely with respect to the guide members to obtain proper illuminance distribution, thus complicating maintenance of the image reader.

SUMMARY

At least one embodiment may provide a lighting device that includes a light source, a first sandwiching member, a second sandwiching member, a reflection member, and a positioning member. The light source emits light. The first sandwiching member includes a first opposed surface. The second sandwiching member includes a second opposed surface opposing the first opposed surface of the first sandwiching member. The first sandwiching member and the second sandwiching member sandwich the light source in such a manner that the light source is detachably attached to the first sandwiching member and the second sandwiching member. The reflection member is provided on the first opposed surface of the first sandwiching member and the second opposed surface of the second sandwiching member to reflect the light emitted by the light source toward an irradiation region on an original document sheet. The positioning member is provided in the first opposed surface of the first sandwiching member and the second opposed surface of the second sandwiching member to position the light source with respect to the reflection member.

At least one embodiment may provide a lighting device that includes a light source, a first sandwiching member, a second sandwiching member, a reflection member, and a concave member. The light source emits light, and includes a board mounting a plurality of light emitting elements aligned substantially straight in a main scanning direction. The first sandwiching member includes a first opposed surface. The second sandwiching member includes a second opposed surface opposing the first opposed surface of the first sandwiching member. The first sandwiching member and the second sandwiching member sandwich the board of the light source in such a manner that the light source is detachably attached to the first sandwiching member and the second sandwiching member. The reflection member is provided on the first opposed surface of the first sandwiching member and the second opposed surface of the second sandwiching member to reflect the light emitted by the light source toward an irradiation region on an original document sheet. The concave member is provided in the first opposed surface of the first sandwiching member and the second opposed surface of the second sandwiching member to engage the board of the light source.

At least one embodiment may provide a lighting device that includes means for emitting light, first and second means for sandwiching the means for emitting, means for reflecting the light emitted by the means for emitting, and means for positioning the means for emitting with respect to the means for reflecting.

The first means for sandwiching the means for emitting includes a first opposed surface. The second means for sandwiching the means for emitting includes a second opposed surface opposing the first opposed surface of the first means for sandwiching the means for emitting. The means for emitting is detachably attached to the first and second means for sandwiching the means for emitting. The means for reflecting the light emitted by the means for emitting toward an irradiation region on an original document sheet is provided on the first opposed surface of the first means for sandwiching and the second opposed surface of the second means for sandwiching. The means for positioning the means for emitting with respect to the means for reflecting is provided in the first opposed surface of the first means for sandwiching and the second opposed surface of the second means for sandwiching.

Additional features and advantages of example embodiments will be more fully apparent from the following detailed description, the accompanying drawings, and the associated claims.

BRIEF DESCRIPTION OF THE DRAWINGS

A more complete appreciation of example embodiments and the many attendant advantages thereof will be readily obtained as the same becomes better understood by reference to the following detailed description when considered in connection with the accompanying drawings, wherein.

Figure 1:
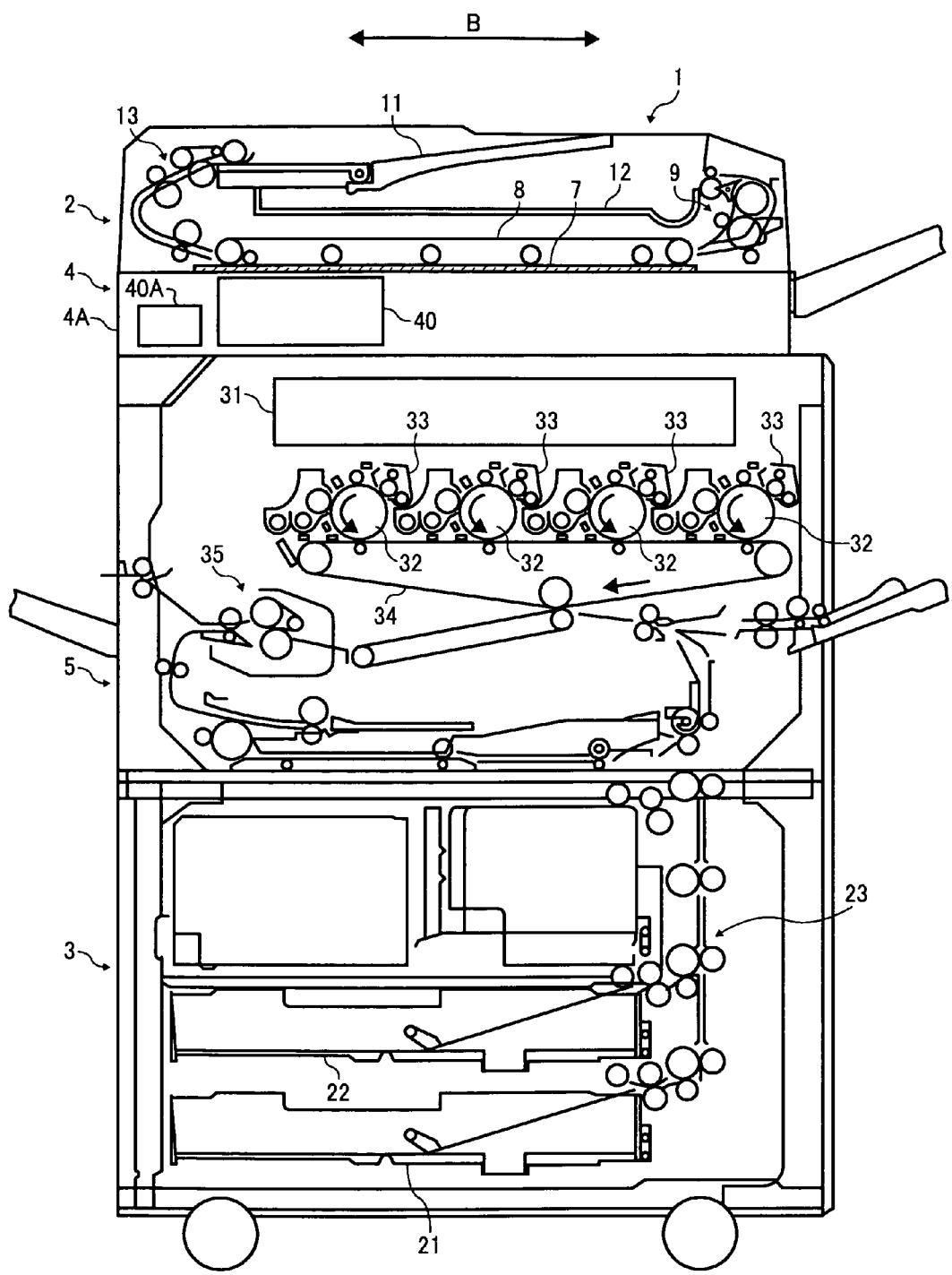
FIG. 1 is a schematic view of an image forming apparatus according to an example embodiment.

The accompanying drawings are intended to depict example embodiments and should not be interpreted to limit the scope thereof. The accompanying drawings are not to be considered as drawn to scale unless explicitly noted.

DETAILED DESCRIPTION OF EXAMPLE EMBODIMENTS

It will be understood that if an element or layer is referred to as being "on", "against", "connected to", or "coupled to" another element or layer, then it can be directly on, against, connected or coupled to the other element or layer, or intervening elements or layers may be present. In contrast, if an element is referred to as being "directly on", "directly connected to", or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

The terminology used herein is for the purpose of describing particular embodiments only and is not intended to be limiting of the present invention. As used herein, the singular forms a "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this specification is not intended to be limited to the specific terminology so selected and it is to be understood that each specific element includes all technical equivalents that operate in a similar manner.

Referring now to the drawings, wherein like reference numerals designate identical or corresponding parts throughout the several views, particularly to FIG. 1, an image forming apparatus 1 according to an example embodiment is explained.

As illustrated in FIG. 1, the image forming apparatus 1 includes an auto document feeder (ADF) 2, a sheet supplier 3, an image reader 4, and/or an image forming device 5.

The ADF 2 includes an original tray 11, a sheet feeder 13, a conveyance belt 8, a sheet discharger 9, and/or a discharge tray 12.

The sheet supplier 3 includes paper trays 21 and 22 and/or a sheet feeder 23.

The image reader 4 includes an exposure glass 7, an optical scanning unit 40, a housing 4A, and/or a driver 40A.

The image forming device 5 includes an exposure device 31, photoconductive drums 32, development devices 33, a transfer belt 34, and/or a fixing device 35.

The image forming apparatus 1 can be a copier or a facsimile machine including an image scanner, a multifunction printer having at least one of copying, printing, scanning, plotter, and facsimile functions, or the like. According to this example embodiment of the present invention, the image forming apparatus 1 functions as a color copier for forming a color image on a recording medium by electrophotography.

In the ADF 2, the sheet feeder 13 includes rollers for feeding original document sheets placed on the original tray 11 one by one toward the exposure glass 7 of the image reader 4. For example, the sheet feeder 13 separates an original document sheet from other original document sheets placed on the original tray 11, and feeds the separated original document sheet toward the exposure glass 7.

The conveyance belt 8 conveys the original document sheet fed by the sheet feeder 13 on the exposure glass 7. After the image reader 4 reads an image on the original document sheet placed on the exposure glass 7, the conveyance belt 8 discharges the original document sheet out of the exposure glass 7 toward the sheet discharger 9. The sheet discharger 9 includes rollers for feeding the original document sheet toward the discharge tray 12 provided under the original tray 11. The ADF 2 is opened and closed with respect to the image reader 4 via an open-close mechanism including a hinge.

In the sheet supplier 3, the paper trays 21 and 22 load sheets of different sizes, serving as a recording medium, respectively. The sheet feeder 23 includes rollers for feeding a sheet from the paper tray 21 or 22 toward the image forming device 5.

The image reader 4 may be an image scanner. In the image reader 4, the optical scanning unit 40, which is an all-in-one unit, is provided inside the housing 4A of the image reader 4. The driver 40A provided in the image reader 4 moves the optical scanning unit 40 in a direction B, that is, a sub-scanning direction. The exposure glass 7 is disposed on the housing 4A of the image reader 4 to serve as a top surface of the housing 4A.

The driver 40A for moving the optical scanning unit 40 may be a known driver including a wire, a plurality of pulleys including a driving pulley and a driven pulley, and/or a motor. For example, the wire is fixed to the optical scanning unit 40. The plurality of pulleys is laid over the wire. The motor rotates the driving pulley.

In the image forming device 5, the exposure device 31 forms electrostatic latent images on the photoconductive drums 32 rotating counterclockwise in FIG. 1 according to image data corresponding to respective colors (e.g., cyan, yellow, magenta, and black) and sent from the image reader 4. The development devices 33 oppose the photoconductive drums 32 and contain cyan, yellow, magenta, and black toners, respectively. The development devices 33 supply the cyan, yellow, magenta, and black toners to the electrostatic latent images formed on the photoconductive drums 32 to make the electrostatic latent images visible as cyan, yellow, magenta, and black toner images, respectively.

The cyan, yellow, magenta, and black toner images formed on the photoconductive drums 32, respectively, are transferred and superimposed onto the transfer belt 34 rotating clockwise in FIG. 1 to form a color toner image on the transfer belt 34. The color toner image formed on the transfer belt 34 is transferred onto a sheet sent from the sheet supplier 3. Thereafter, the fixing device 35 melts toners forming the color toner image to fix the color toner image on the sheet.

The image forming apparatus 1 may include an image transmitter-receiver for sending image data generated by reading an image on an original document sheet to a destination device (e.g., an external device).

Figure 2:
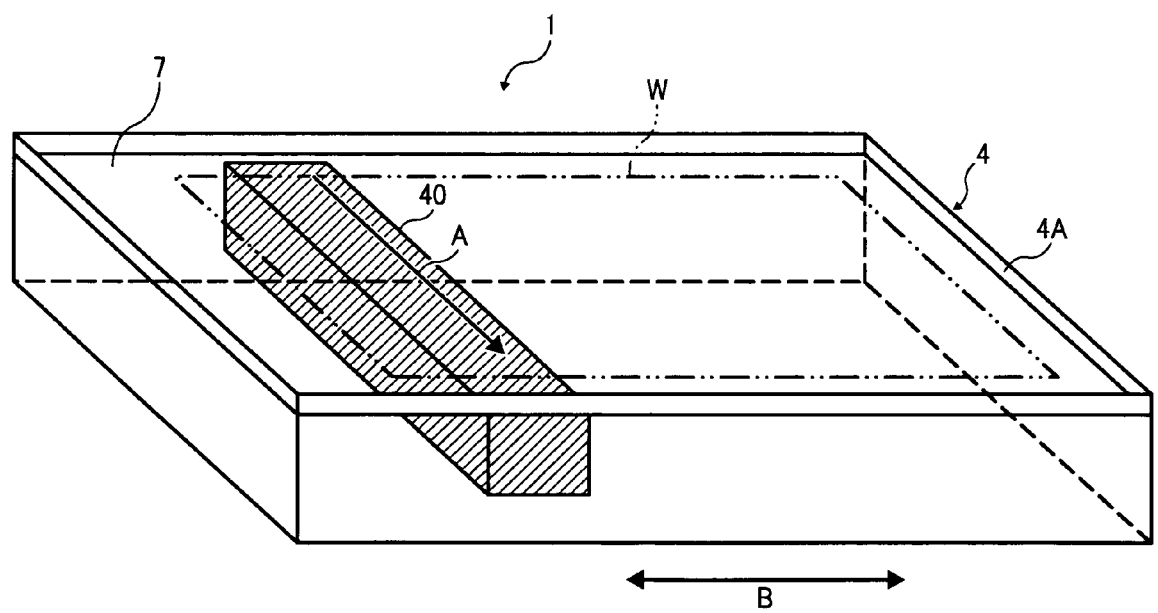
FIG. 2 is a schematic perspective view (according to an example embodiment) of an image reader included in the image forming apparatus shown in FIG. 1.

FIG. 2 is a schematic perspective view of the image reader 4. In the optical scanning unit 40 of the image reader 4, an LED (light-emitting diode) unit (described below) emits light in a direction A, that is, a main scanning direction. The driver 40A (depicted in FIG. 1) provided in the image reader 4 moves the optical scanning unit 40 in the direction B, that is, the sub-scanning direction, throughout a whole irradiation region W, so that the image reader 4 reads a two-dimensional image on an original document sheet.

Figure 3:
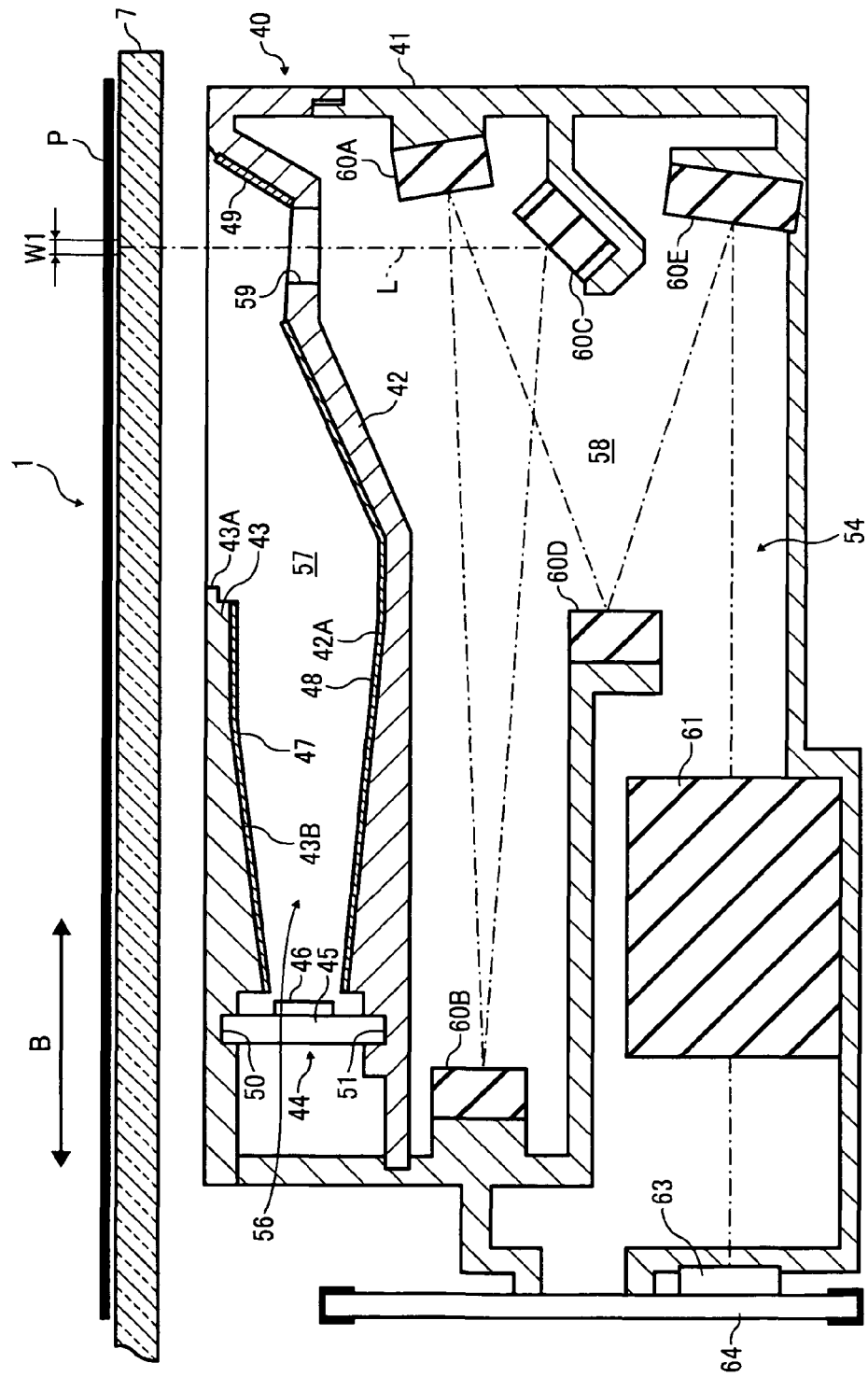
FIG. 3 is a sectional view (according to an example embodiment) of an optical scanning unit included in the image reader shown in FIG. 2.

Referring to FIGS. 3 to 13, the following describes a structure of the optical scanning unit 40. FIG. 3 is a sectional view of the optical scanning unit 40. The optical scanning unit 40 includes a housing 41, a reading device 54, a lighting device 56, a first space 57, and/or a second space 58.

The reading device 54 includes reflection mirrors 60A, 60B, 60C, 60D, and 60E, an image forming lens 61, a CCD (charge coupled device) 63, and/or an SBU (scanner board unit) 64.

The lighting device 56 includes a shield member 42, a cover 43, an opening 43A, an LED (light-emitting diode) unit 44, reflection members 47 to 49, and/or grooves 50 and 51.

The shield member 42 includes an opposed surface 42A and/or a slit 59.

The cover 43 includes an opposed surface 43B.

The LED unit 44 includes an LED board 45 and/or an LED package 46.

The shield member 42, serving as a second sandwiching member, is detachably attached to the housing 41. The cover 43, serving as a first sandwiching member, is detachably attached to the shield member 42. The LED unit 44 emits light to an irradiation region W1 on an original document sheet P through the opening 43A provided between the shield member 42 and the cover 43. Each of the housing 41, the shield member 42, and the cover 43 includes resin.

Figure 4:
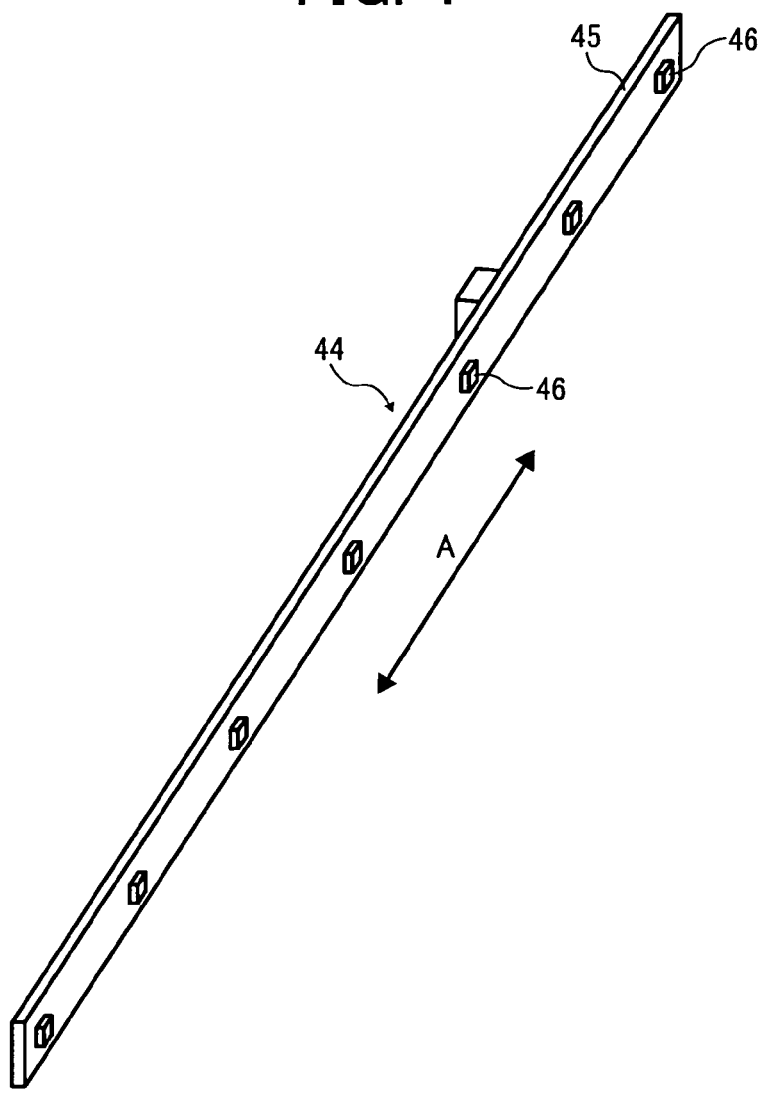
FIG. 4 is a perspective view (according to an example embodiment) of an LED (light-emitting diode) unit included in the optical scanning unit shown in FIG. 3.

The LED unit 44, serving as a light source, is attached to the shield member 42 and the cover 43. FIG. 4 is a perspective view of the LED unit 44. As illustrated in FIG. 4, in the LED unit 44, a plurality of LED packages 46, serving as a plurality of light emitting elements, is aligned on the LED board 45, serving as a board, substantially straight in the direction A, that is, the main scanning direction. According to this example embodiment, seven LED packages 46 are provided on the LED board 45.

According to this example embodiment, a top view type LED package is used as the LED package 46. For example, the LED package 46 emits light from an emission surface in a direction perpendicular to a packaging surface mounted on the LED board 45.

The top view type LED package 46 has directivity in emission intensity distribution. Emission light has intensity distribution corresponding to Lambert's law of cosines, so-called Lambert's distribution based on a luminous surface perpendicular to an emission angle. FIG. 3 is a sectional view of the optical scanning unit 40, which illustrates one of the LED packages 46.

As illustrated in FIG. 3, the reflection member 47 is provided on a lower surface of the cover 43. The reflection members 48 and 49 are provided on an upper surface of the shield member 42, which opposes the cover 43.

For example, the reflection member 47 is provided on the opposed surface 43B serving as the lower surface of the cover 43 and a first opposed surface. The reflection members 48 and 49 are provided on the opposed surface 42A serving as the upper surface of the shield member 42 and a second opposed surface, which opposes the opposed surface 43B of the cover 43.

The LED board 45 is provided between the shield member 42 and the cover 43 in a direction in which a center axis of emission light emitted by the LED package 46 is substantially parallel to a horizontal direction. An upper end of the LED board 45 engages the groove 50 serving as a positioning member or a concave member provided in the opposed surface 43B of the cover 43. A lower end of the LED board 45 engages the groove 51 serving as a positioning member or a concave member provided in the opposed surface 42A of the shield member 42. Thus, the LED board 45 and the grooves 50 and 51 uniquely determine a position of the LED package 46.

When the LED board 45 engages the grooves 50 and 51, the LED unit 44 is sandwiched between the shield member 42 and the cover 43. When the LED board 45 disengages the grooves 50 and 51, the LED unit 44 is separated from the shield member 42 and the cover 43. In other words, the LED unit 44 is detachably attached to the shield member 42 and the cover 43.

Figure 5:
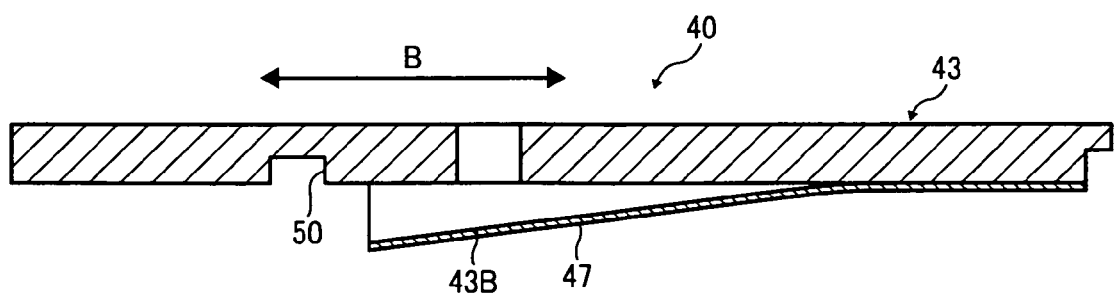
FIG. 5 is a sectional view (according to an example embodiment) of a cover included in the optical scanning unit shown in FIG. 3.
Figure 6:
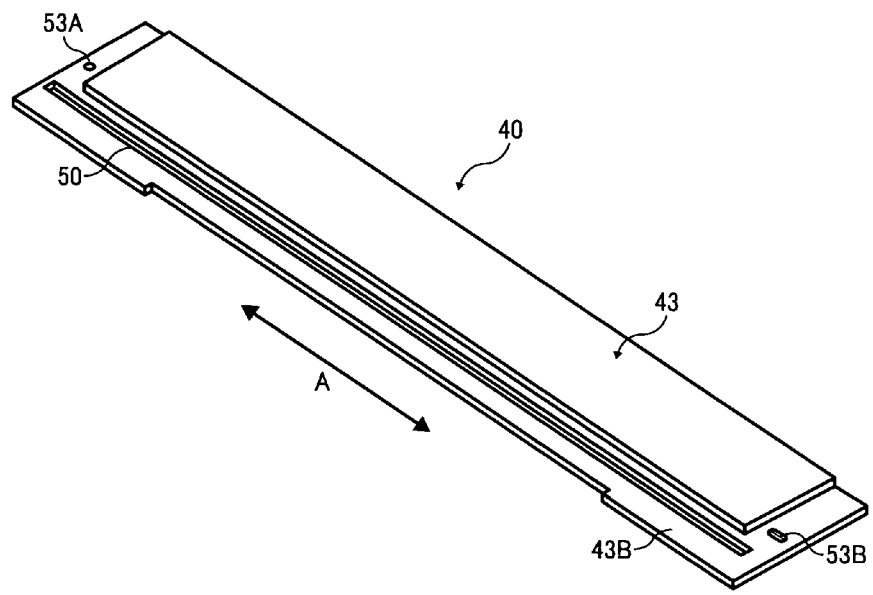
FIG. 6 is a perspective bottom view (according to an example embodiment) of the cover shown in FIG. 5.

FIG. 5 is a sectional view of the cover 43. FIG. 6 is a perspective bottom view of the cover 43. As illustrated in FIG. 6, the cover 43 further includes holes 53A and 53B.

Figure 7:
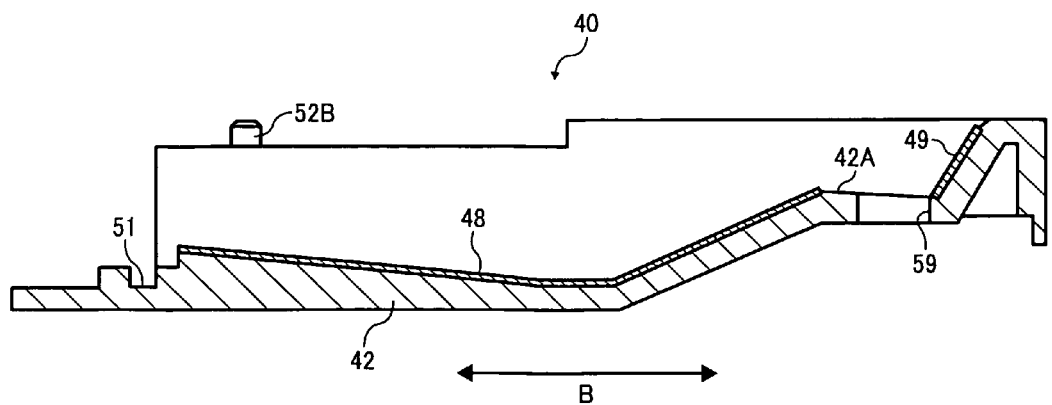
FIG. 7 is a sectional view (according to an example embodiment) of a shield member included in the optical scanning unit shown in FIG. 3.

FIG. 7 is a sectional view of the shield member 42. As illustrated in FIG. 7, the shield member 42 further includes a protrusion 52B.

Figure 8:
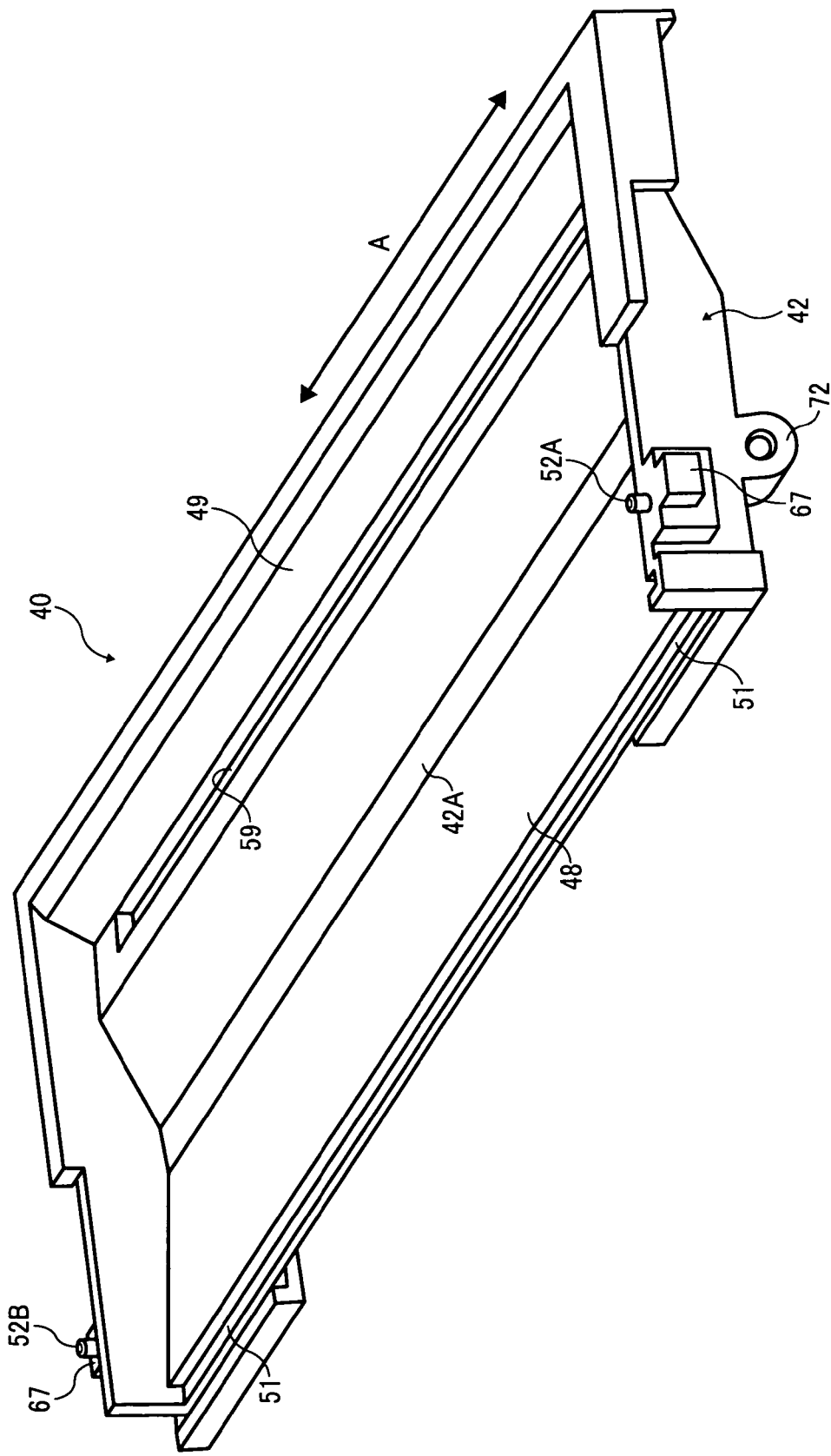
FIG. 8 is a perspective top view (according to an example embodiment) of the shield member shown in FIG. 7.

FIG. 8 is a perspective top view of the shield member 42. As illustrated in FIG. 8, the shield member 42 further includes protrusions 52A and 67 and/or a bolt hole 72.

Figure 9:
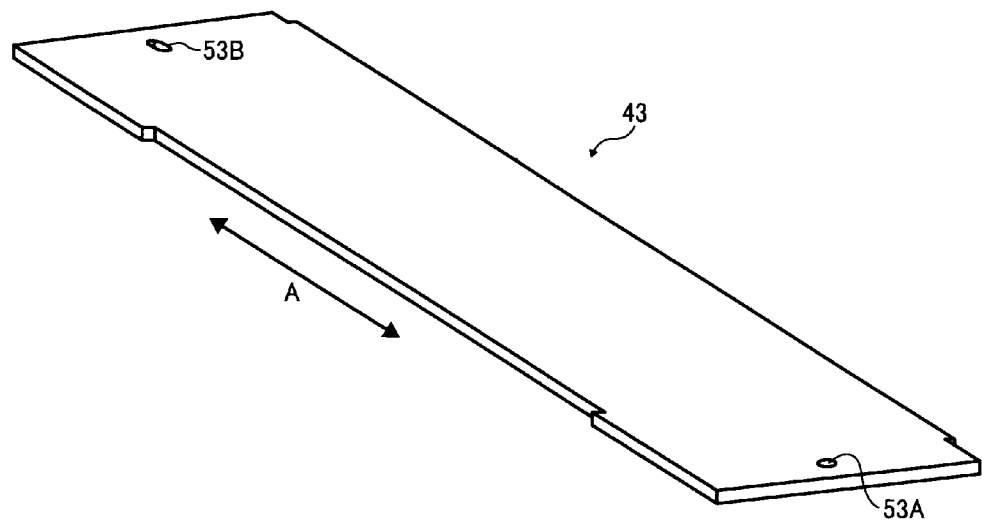
FIG. 9 is a perspective top view (according to an example embodiment) of the cover shown in FIG. 5.

FIG. 9 is a perspective top view of the cover 43.

As illustrated in FIG. 8, the protrusions 52A and 52B are provided at both ends of the shield member 42 in the direction A, that is, the main scanning direction, and protrude upward from the both ends of the shield member 42, respectively.

As illustrated in FIG. 6, the holes 53A and 53B are provided at both ends of the cover 43 in the direction A, that is, the main scanning direction, to engage the protrusions 52A and 52B depicted in FIG. 8.

As illustrated in FIG. 9, the hole 53A is a reference round hole and the hole 53B is an elongate hole elongating in the direction A, that is, the main scanning direction. Therefore, when the protrusions 52A and 52B depicted in FIG. 8 engage the holes 53A and 53B, respectively, the holes 53A and 53B can absorb dimensional deviation between the shield member 42 depicted in FIG. 8 and the cover 43.

The elongate hole 53B elongating in the direction A, that is, the main scanning direction, can prevent the LED board 45 depicted in FIG. 3 from tilting in the direction B, that is, the sub-scanning direction.

As illustrated in FIG. 3, the cover 43 prevents or reduces external light entering the optical scanning unit 40 from an outside of the optical scanning unit 40. The reflection member 47 provided on the opposed surface 43B of the cover 43 guides emission light emitted by the LED package 46 to the reflection member 49.

According to this example embodiment, the reflection members 47 to 49 include a base material molded to have a reflection plane shape corresponding to the opposed surface 43B of the cover 43 and the opposed surface 42A of the shield member 42, and aluminum evaporated onto a surface of the base material.

Alternatively, the reflection members 47 to 49 may include a base material molded to have a reflection plane shape, and a reflection sheet, such as an aluminum foil sheet attached to the base material. Yet alternatively, the reflection members 47 to 49 may include a reflection surface kneaded with a reflection material to coat the reflection members 47 to 49. Yet alternatively, the reflection members 47 to 49 may be plated with a reflection material.

According to this example embodiment, the protrusions 52A and 52B depicted in FIG. 8 engage the holes 53A and 53B depicted in FIG. 9, respectively, to position the shield member 42 relatively to the cover 43. Therefore, the grooves 50 and 51 provided in the cover 43 and the shield member 42, respectively, to position the LED board 45 can be provided in directions perpendicular to the exposure glass 7. Thus, the LED board 45 can be held vertically. Consequently, the LED package 46 can emit light from the emission surface provided parallel to the LED board 45 in such a manner that the center axis of the light extends in the horizontal direction.

The emission surface of the LED package 46 is oriented to extend the center axis of the emission light emitted by the LED package 46 in the horizontal direction. Accordingly, the emission light emitted by the LED package 46 travels substantially in the horizontal direction while spreading in a reference angle.

Emission light emitted by the LED package 46 and reflected by the reflection member 48 provided on the shield member 42 irradiates the irradiation region W1 on an original document sheet P from a left side of the irradiation region W1 in FIG. 3. Emission light reflected by the reflection member 47 provided on the cover 43 is further reflected by the reflection member 49 provided on the shield member 42, and irradiates the irradiation region W1 on the original document sheet P from a right side of the irradiation region W1 in FIG. 3. Emission light, which directly irradiates the reflection member 49 provided on the shield member 42 from the LED package 46 and is reflected by the reflection member 49, also irradiates the irradiation region W1 on the original document sheet P from the right side of the irradiation region W1 in FIG. 3.

The irradiation region W1 is a given range on the exposure glass 7. When the right side of the irradiation region W1 is defined as a front side in the direction B, that is, the sub-scanning direction, and the left side of the irradiation region W1 is defined as a rear side in the direction B, that is, the sub-scanning direction, the reflection members 47 to 49 cause light to irradiate the irradiation region W1 substantially uniformly from the front and rear sides in the direction B, that is, the sub-scanning direction. Accordingly, a three-dimensional image, such as a cut-and-paste image, on an original document sheet P does not shade the original document sheet P.

The cover 43 and the shield member 42 are bent to guide emission light emitted by the LED package 46 toward the irradiation region W1 with uniform illuminance distribution in the direction B, that is, the sub-scanning direction.

In the optical scanning unit 40, the lighting device 56 is provided inside the housing 41, and includes the LED unit 44, the cover 43, and the shield member 42. The LED unit 44 emits light. The cover 43 is provided with the reflection member 47 for reflecting the emission light emitted by the LED unit 44 toward the irradiation region W1 on an original document sheet P. The shield member 42 is provided with the reflection members 48 and 49 for reflecting the emission light emitted by the LED unit 44 toward the irradiation region W1 on the original document sheet P.

The shield member 42 is detachably attached to the housing 41, and divides an inside of the housing 41 into the first space 57 in which the LED unit 44 is provided, and the second space 58 in which the reading device 54 is provided. The second space 58 is provided under the first space 57. In other words, the shield member 42 separates or shields the reading device 54 from the lighting device 56 so as to provide the second space 58, which contains the reading device 54, inside the housing 41.

The opposed surface 42A of the shield member 42 forms a bottom portion of the lighting device 56. The shield member 42 separates or shields the second space 58 from the first space 57 so that light other than reflection light reflected by an original document sheet P does not enter the second space 58. The shield member 42 covers a lower portion of the lighting device 56, and is attached to the housing 41 in such a manner that no gap is provided between the shield member 42 and the housing 41.

The reflection member 47 is provided on the opposed surface 43B of the cover 43, which opposes the first space 57. The reflection members 48 and 49 are provided on the opposed surface 42A of the shield member 42, which opposes the first space 57. Thus, the first space 57, which is separated from the second space 58, is provided.

As illustrated in FIGS. 3, 7, and 8, the slit 59 is provided in the shield member 42, and extends in the direction A, that is, the main scanning direction. The slit 59 is provided at a position far away from the LED unit 44 in a right side of the LED unit 44 in FIG. 3.

The slit 59 is provided between the reflection members 48 and 49, and guides reflection light reflected by an original document sheet P, for example, reflection light reflected by an image on the original document sheet P, from the first space 57 to the second space 58.

The slit 59 provides a top-to-bottom opening. A top of the opening is provided at a position higher than a center of the LED package 46. In other words, the slit 59 is provided closer to an original document sheet P. Accordingly, the slit 59 suppresses or reduces emission light emitted by the LED package 46 and entering from the first space 57 to the second space 58. Consequently, the slit 59 guides reflection light reflected by the original document sheet P into the second space 58.

A surface of the shield member 42 near the slit 59, on which the reflection members 48 and 49 are not provided, and an inner circumferential surface of the slit 59 in a vertical direction are processed by surface processing to provide a low reflectance or processed in black, so that a portion of the opposed surface 42A of the shield member 42, on which the reflection members 48 and 49 are not provided, does not reflect light easily.

The reflection mirrors 60A to 60E, the image forming lens 61, and the CCD 63 are attached to the housing 41 in the second space 58. The CCD 63 serves as an image pickup device. The reflection mirrors 60A to 60E, the image forming lens 61, and the CCD 63 serve as the reading device 54.

When emission light emitted by the LED unit 44 irradiates the irradiation region W1 on an original document sheet P via the reflection members 47 to 49, reflection light L reflected by the original document sheet P in the irradiation region W1 in the main scanning direction is guided to the second space 58. For example, a light axis of the reflection light L is guided to the second space 58 via the slit 59 provided in the shield member 42. Accordingly, the reflection mirrors 60C, 60B, 60A, 60D, and 60E reflect the reflection light L in this order. Namely, the reflection mirrors 60A to 60E are attached to given positions on the housing 41 to guide the reflection light L to the image forming lens 61.

The image forming lens 61 is attached to a bottom of the housing 41, and forms the reflection light L reflected by the reflection mirror 60E into an image. The CCD 63 is attached to one side of the housing 41 in the direction B, that is, the sub-scanning direction, at a position at which the image forming lens 61 forms the image. Thus, the CCD 63 reads an original image on an original document sheet P. According to this example embodiment, the optical scanning unit 40 includes a plurality of CCDs 63 corresponding to red, green, and blue, respectively, to read a color image on an original document sheet P.

The CCD 63 is mounted on the SBU 64 attached to one side of the housing 41 in the direction B, that is, the sub-scanning direction. In addition to the CCD 63, electronic parts, such as an IC (integrated circuit) chip and a chip condenser, are mounted on the SBU 64 to perform image processing on an image read by the CCD 63 to generate image data to be sent to the exposure device 31 depicted in FIG. 1.

Referring to FIGS. 10 to 13, the following describes a structure of the housing 41 and a relation of the housing 41 to the shield member 42 and the cover 43.

Figure 10:
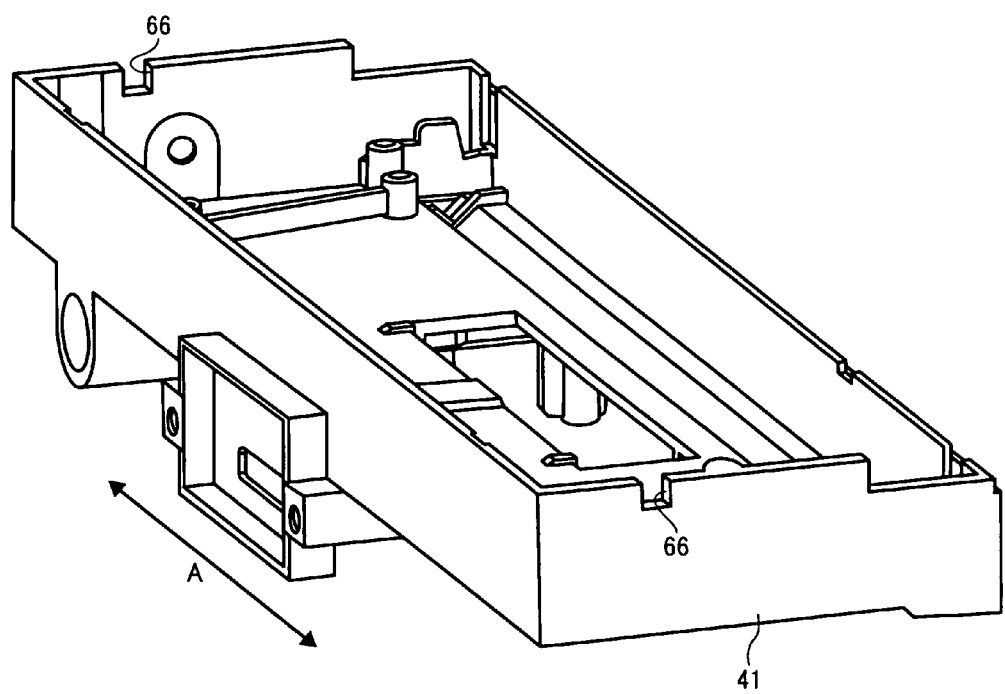
FIG. 10 is a perspective top view (according to an example embodiment) of a housing included in the optical scanning unit shown in FIG. 3.

FIG. 10 is a perspective top view of the housing 41. As illustrated in FIG. 10, the housing 41 includes grooves 66.

Figure 11:
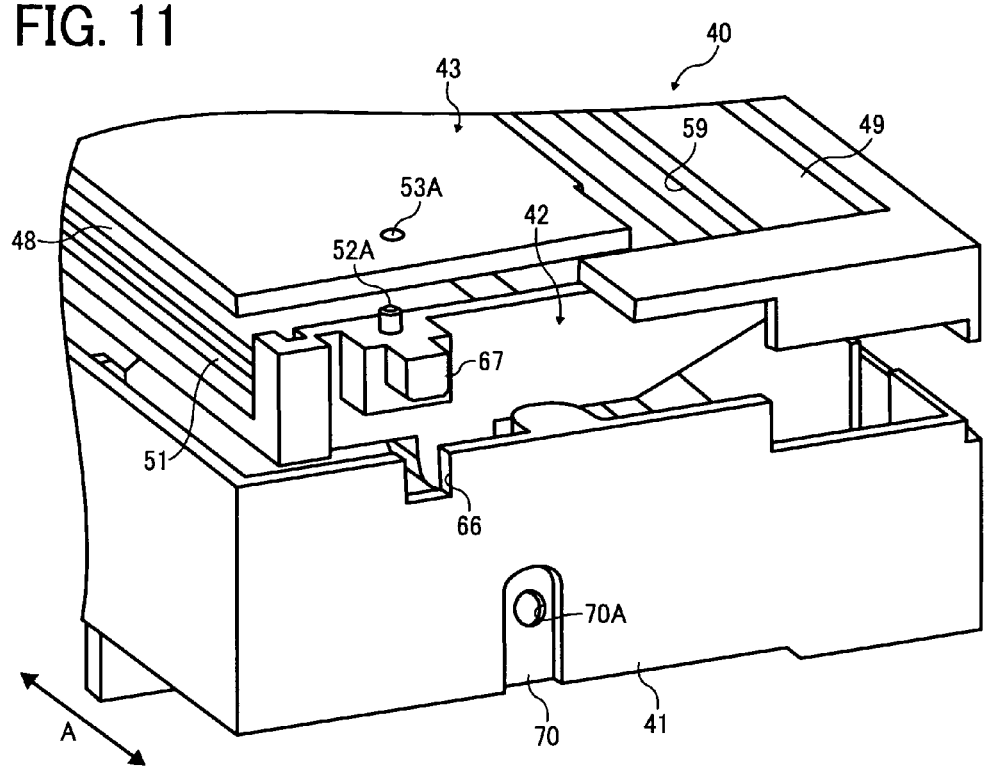
FIG. 11 is an exploded, partially perspective view (according to an example embodiment) of the optical scanning unit shown in FIG. 3 when the housing shown in FIG. 10, the shield member shown in FIG. 7, and the cover shown in FIG. 5 are disassembled from each other.

FIG. 11 is an exploded, partially perspective view of the optical scanning unit 40 when the housing 41, the shield member 42, and the cover 43 are disassembled from each other. As illustrated in FIG. 11, the housing 41 further includes a groove 70. The groove 70 includes a bolt hole 70A.

Figure 12:
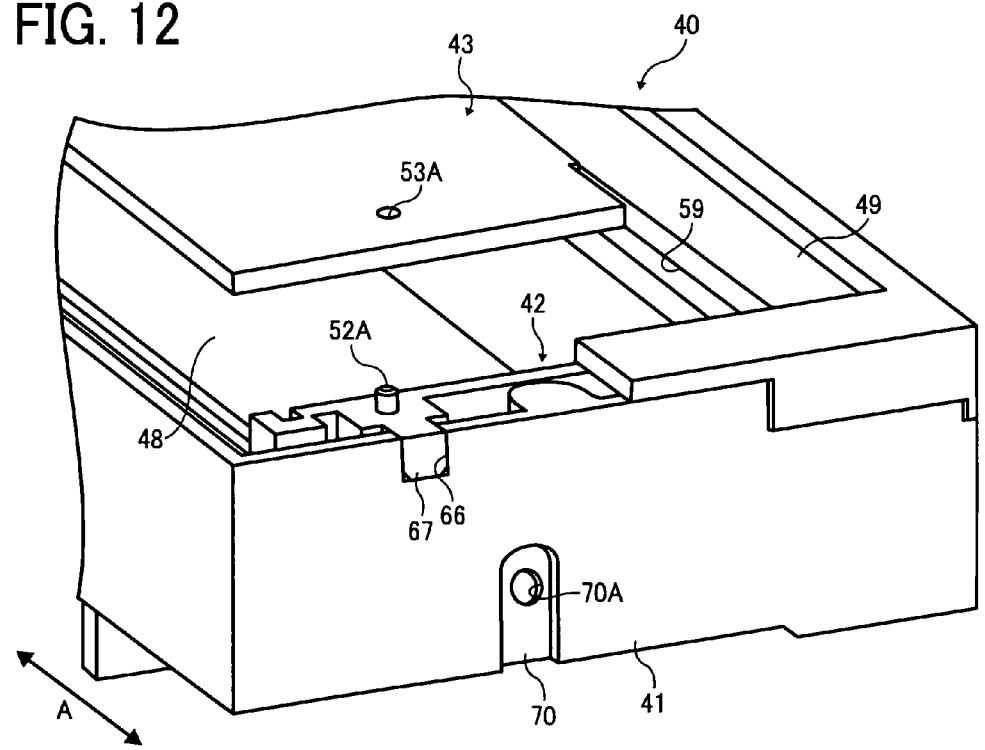
FIG. 12 is an exploded, partially perspective view (according to an example embodiment) of the optical scanning unit shown in FIG. 3 when the housing shown in FIG. 10 and the shield member shown in FIG. 7 are disassembled from the cover shown in FIG. 5.

FIG. 12 is an exploded, partially perspective view of the optical scanning unit 40 when the housing 41 and the shield member 42 are disassembled from the cover 43.

Figure 13:
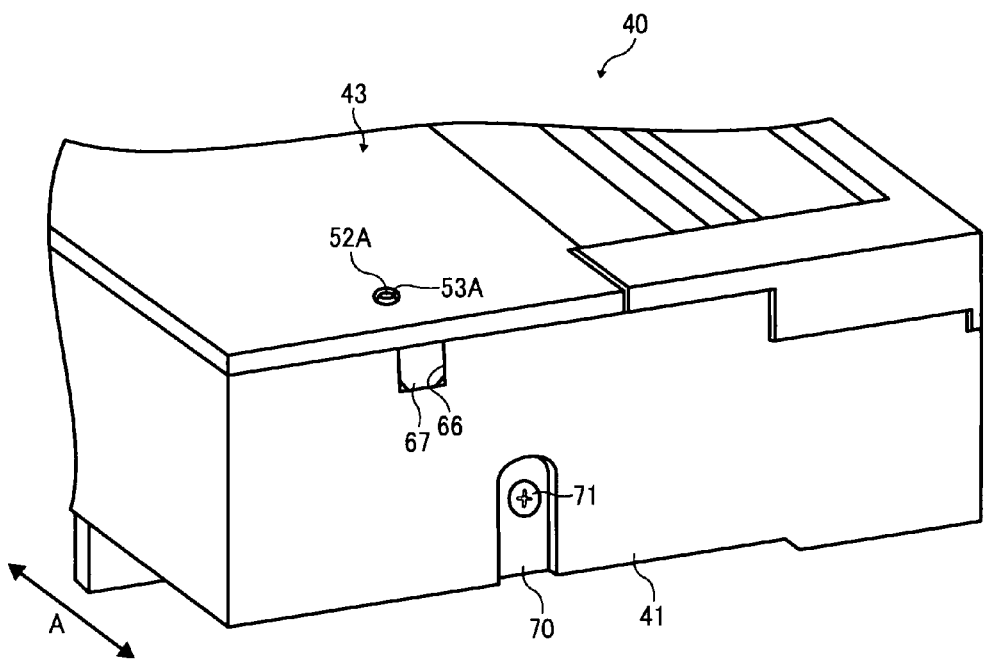
FIG. 13 is a partially perspective view (according to an example embodiment) of the optical scanning unit shown in FIG. 3 when the housing shown in FIG. 10, the shield member shown in FIG. 7, and the cover shown in FIG. 5 are assembled.

FIG. 13 is a partially perspective view of the optical scanning unit 40 when the housing 41, the shield member 42, and the cover 43 are assembled. As illustrated in FIG. 13, the housing 41 further includes a bolt 71.

As illustrated in FIG. 10, the grooves 66 are provided at both ends of the housing 41 in the direction A, that is, the main scanning direction, as a pair of grooves 66 serving as a first positioner. A line connecting an inner side of one of the grooves 66 to an inner side of another one of the grooves 66 is parallel to the direction A, that is, the main scanning direction. FIGS. 11 to 13 illustrate one of the grooves 66.

As illustrated in FIG. 8, the protrusions 61 are provided at both ends of the shield member 42 in the direction A, that is, the main scanning direction, to serve as a second positioner. The protrusions 67 protrude horizontally from both ends of the shield member 42 in the direction A, that is, the main scanning direction, to engage the grooves 66 depicted in FIG. 10, respectively.

When the shield member 42 is attached to the housing 41 depicted in FIG. 10 by engaging the protrusions 67 with the grooves 66, the LED unit 44 is positioned with respect to the reflection mirrors 60A to 60E, the image forming lens 61, and the CCD 63 depicted in FIG. 3.

In the image forming apparatus 1 depicted in FIG. 3, emission light emitted from the LED package 46 to the irradiation region W1 on an original document sheet P includes red, green, and blue lines, each of which has a width of several tens of micrometers.

Therefore, when reflection light L reflected by the original document sheet P enters the CCD 63 via the reflection mirrors 60A to 60E and the image forming lens 61 in a state in which the light axis of the reflection light L is shifted, a balance among amounts of light corresponding to red, green, and blue may fluctuate, and thereby the CCD 63 may not read a bright image.

To address this, according to this example embodiment, the protrusions 67 (depicted in FIG. 8), which are provided at both ends of the shield member 42 in the direction A, that is, the main scanning direction, to position the LED unit 44 and the reflection members 47 to 49 with respect to the reflection mirrors 60A to 60E, the image forming lens 61, and the CCD 63, engage the grooves 66 (depicted in FIG. 10) provided in the housing 41. Therefore, simply attaching the shield member 42 to the housing 41 can generate uniform illuminance distribution in the sub-scanning direction in the irradiation region W1 on an original document sheet P to cause a position of a peak amount of light in the illuminance distribution to correspond to a center of a reading region, that is, a center of the CCD 63.

As illustrated in FIGS. 3 and 11, the grooves 66 and the protrusions 67 are provided near the grooves 50 and 51 provided in the cover 43 and the shield member 42, respectively, to position the LED board 45. The upper end and the lower end of the LED board 45 engage the grooves 50 and 51, respectively. After the LED board 45 is attached to the cover 43 and the shield member 42, the protrusions 67 engage the grooves 66, respectively. Thus, when the cover 43 and the shield member 42 are attached to the housing 41, the LED board 45 is positioned in parallel to the direction A, that is, the main scanning direction.

The grooves 66 and the protrusions 67 provided near the grooves 50 and 51 for positioning the LED board 45, respectively, can position the LED board 45 in a direction in which the center axis of emission light emitted by the LED package 46 is substantially parallel to the horizontal direction with improved precision.

As illustrated in FIG. 11, the groove 70 is provided in one side of the housing 41 in the direction A, that is, the main scanning direction. The bolt hole 70A is provided on a bottom of the groove 70.

As illustrated in FIG. 8, the bolt hole 72 is provided at one end of the shield member 42 in the direction A, that is, the main scanning direction. A thread is formed on an inner circumferential surface of the bolt hole 72. When the shield member 42 is attached to the housing 41, the bolt hole 72 of the shield member 42 is aligned with the bolt hole 70A of the housing 41 depicted in FIG. 11.

As illustrated in FIG. 13, when the bolt 71 is screwed into the bolt hole 72 via the bolt hole 70A, the shield member 42 is fixed to the housing 41. Depth of the groove 70 is substantially equal to height of a head of the bolt 71, so that the head of the bolt 71 does not protrude from the side of the housing 41 in which the groove 70 is provided.

Referring to FIG. 3, the following describes a procedure for assembling the optical scanning unit 40.

After the upper end and the lower end of the LED board 45 engage the groove 50 provided in the cover 43 and the groove 51 provided in the shield member 42, respectively, the protrusions 52A and 52B (depicted in FIG. 8) of the shield member 42 engage the holes 53A and 53B (depicted in FIG. 9) of the cover 43. Thus, positioning of the shield member 42 with respect to the cover 43, that is, positioning of the reflection members 48 and 49 with respect to the reflection member 47, is performed simultaneously with positioning of the LED board 45 with respect to the reflection members 47 to 49.

For example, simply engaging the LED board 45 with the grooves 50 and 51 can uniquely determine a position of the LED package 46 with respect to the shield member 42 and the cover 43 to integrate the shield member 42 with the cover 43, resulting in the lighting device 56 serving as a unit.

The hole 53B (depicted in FIG. 6) provided in the cover 43 is an elongate hole elongating in the direction A, that is, the main scanning direction, preventing the LED board 45 from tilting in the direction B, that is, the sub-scanning direction.

Accordingly, in the LED unit 44, the LED board 45 is disposed between the shield member 42 and the cover 43 in such a manner that the center axis of emission light emitted by the LED package 46 extends substantially in the horizontal direction.

Thereafter, the protrusions 67 (depicted in FIG. 8) provided at both ends of the shield member 42 in the direction A, that is, the main scanning direction, engage the grooves 66 (depicted in FIG. 10) provided in the housing 41, respectively, to attach the shield member 42 to the housing 41. Accordingly, the shield member 42 divides the inside of the housing 41 into the first space 57 in which the lighting device 56 is provided, and the second space 58 in which the reading device 54 is provided. Simultaneously, the LED unit 44 and the reflection members 47 to 49 are positioned with respect to the reflection mirrors 60A to 60E, the image forming lens 61, and the CCD 63, so as to generate uniform illuminance distribution in the direction B, that is, the sub-scanning direction in the irradiation region W1 on an original document sheet P to cause the position of the peak amount of light in the illuminance distribution to correspond to the center of the CCD 63.

Thereafter, the bolt 71 (depicted in FIG. 13) is screwed into the bolt hole 72 (depicted in FIG. 8) via the bolt hole 70A (depicted in FIG. 11) to fix the shield member 42 to the housing 41. Thus, the optical scanning unit 40 is assembled.

In order to read an original image on an original document sheet P in the image forming apparatus 1, the LED package 46 of the LED unit 44 emits emission light to the irradiation region W1 on the original document sheet P while the driver 40A (depicted in FIG. 1) moves the optical scanning unit 40 in the direction B, that is, the sub-scanning direction.

In the LED unit 44, the emission surface of the LED package 46 is oriented to extend the center axis of the emission light emitted by the LED package 46 in the horizontal direction. Accordingly, the emission light emitted by the LED package 46 travels substantially in the horizontal direction while spreading in a reference angle.

Emission light emitted by the LED package 46 and reflected by the reflection member 48 provided on the shield member 42 irradiates the irradiation region W1 on an original document sheet P from the left side of the irradiation region W1 in FIG. 3. Emission light reflected by the reflection member 47 provided on the cover 43 is further reflected by the reflection member 49 provided on the shield member 42, and irradiates the irradiation region W1 on the original document sheet P from the right side of the irradiation region W1 in FIG. 3. Emission light, which directly irradiates the reflection member 49 provided on the shield member 42 from the LED package 46 and is reflected by the reflection member 49, also irradiates the irradiation region W1 on the original document sheet P from the right side of the irradiation region W1 in FIG. 3.

Accordingly, the position of the peak amount of light in the illuminance distribution in the irradiation region W1 corresponds to the center of the reading region, that is, the center of the CCD 63. Namely, the LED unit 44 irradiates the irradiation region W1 on the original document sheet P with uniform illuminance distribution. The reflection mirrors 60A to 60E guide reflection light reflected by the original document sheet P and forming a reading light axis to the image forming lens 61. The image forming lens 61 forms the light into an image at the center of the CCD 63.

The position of the peak amount of light in the illuminance distribution in the irradiation region W1 corresponding to the center of the reading region may not fluctuate the balance among amounts of light corresponding to red, green, and blue, and thereby the CCD 63 can read a bright color image.

As described above, according to this example embodiment, the lighting device 56 includes the LED unit 44, the shield member 42 and the cover 43 sandwiching the LED unit 44, and the reflection members 47 to 49. The reflection member 47 is provided on the opposed surface 43B of the cover 43. The reflection members 48 and 49 are provided on the opposed surface 42A of the shield member 42. The reflection members 47 to 49 cause emission light emitted by the LED package 46 to irradiate the irradiation region W1 on an original document sheet P from the front and rear sides of the irradiation region W1 in the direction B, that is, the sub-scanning direction. The LED unit 44 is detachably attached to the shield member 42 and the cover 43. The groove 50 is provided in the opposed surface 43B of the cover 43 to position the reflection member 47 with respect to the LED unit 44. Similarly, the groove 51 is provided in the opposed surface 42A of the shield member 42 to position the reflection members 48 and 49 with respect to the LED unit 44. Accordingly, fluctuation in the illuminance distribution in the irradiation region W1 can be suppressed or reduced in the direction B, that is, the sub-scanning direction, maintaining a stable amount of light supplied to the irradiation region W1.

The LED board 45 is detachably attached to the groove 50 provided in the cover 43, on which the reflection member 47 is provided, and the groove 51 provided in the shield member 42, on which the reflection members 48 and 49 are provided. In other words, the lighting device 56 can be disassembled to clean or replace the reflection members 47 to 49 and the LED unit 44, and then assembled, providing improved efficiency of maintenance.

Further, the lighting device 56 includes the LED unit 44, the shield member 42, and the cover 43 independently provided from each other. The LED board 45 engages the groove 50 provided in the cover 43 and the groove 51 provided in the shield member 42, so that the cover 43 and the shield member 42 sandwich the LED unit 44 to assemble the lighting device 56. Therefore, the cover 43 and the shield member 42 can be molded easily, improving productivity of the lighting device 56.

The cover 43 is detachably attached to the shield member 42, and emission light emitted by the LED unit 44 irradiates an original document sheet P through the opening 43A provided between the cover 43 and the shield member 42, resulting in the simple structure of the lighting device 56 and reduced manufacturing costs of the lighting device 56. A user can easily access the LED unit 44 and the reflection members 47 to 49 by removing the cover 43 from the housing 41, resulting in easy maintenance of the lighting device 56.

As illustrated in FIG. 4, the LED unit 44 includes the plurality of LED packages 46 aligned substantially straight in the direction A, that is, the main scanning direction. As illustrated in FIG. 3, the LED packages 46 can be positioned with respect to the reflection member 47 provided on the cover 43 and the reflection members 48 and 49 provided on the shield member 42 in such a manner that the LED packages 46 are arranged parallel to the direction A, that is, the main scanning direction (depicted in FIG. 4). Accordingly, the LED unit 44 and the reflection members 47 to 49 can be disposed properly with respect to the irradiation region W1. Consequently, fluctuation in the illuminance distribution in the irradiation region W1 may be suppressed or reduced in the direction B, that is, the sub-scanning direction, maintaining a stable amount of light supplied to the irradiation region W1.

The grooves 50 and 51 extend in the main scanning direction. Accordingly, the LED packages 46 are aligned substantially straight in the main scanning direction with respect to the reflection members 47 to 49. Thus, the LED unit 44 and the reflection members 47 to 49 are disposed properly with respect to the irradiation region W1. Consequently, fluctuation in the illuminance distribution in the direction B, that is, the sub-scanning direction, can be suppressed or reduced in the irradiation region W1 to maintain a stable amount of light supplied to the irradiation region W1.

The LED board 45 engages the grooves 50 and 51 to cause the cover 43 and the shield member 42 to sandwich the LED unit 44. Accordingly, the LED unit 44 is positioned with respect to the reflection members 47 to 49 easily.

The shield member 42 divides the inside of the housing 41 into the first space 57, in which the lighting device 56 is provided, and the second space 58, in which the reading device 54 is provided. The reflection members 48 and 49 are provided on the upper surface of the shield member 42 to cause emission light emitted by the LED unit 44 to irradiate the irradiation region W1 on an original document sheet P. The elongate slit 59 extending in the main scanning direction guides reflection light reflected by the original document sheet P from the first space 57 to the second space 58. Thus, the shield member 42 optically shields the reading device 54 from the lighting device 56 while providing an optical path for guiding the reflection light reflected by the original document sheet P to the reading device 54.

For example, the shield member 42 can prevent or reduce emission light emitted by the LED unit 44 and entering the CCD 63 via the reflection mirrors 60A to 60E and the image forming lens 61. Namely, the shield member 42 can prevent or reduce light (e.g., flare light), other than the reflection light reflected by the original document sheet P, entering the reading device 54.

Particularly, when the reading device 54 includes at least one of the reflection mirrors 60A to 60E, flare light may easily generate according to arrangement of the reflection mirrors 60A to 60E. Further, when a barrel lens for reduction imaging is used as an image forming lens rather than a lens for same magnification imaging, such as Selfoc® Lens Array used for a same magnification sensor, flare light may enter the CCD 63 easily. To address this, according to this example embodiment, the shield member 42 can shield light other than image forming light, that is, light for forming an image in the CCD 63, preventing or reducing flare light effectively.

As illustrated in FIG. 8, the protrusions 67 are provided at both ends of the shield member 42, on which the reflection members 48 and 49 are provided, in the direction A, that is, the main scanning direction. The protrusions 67 engage the grooves 66 of the housing 41 (depicted in FIG. 10) to position the lighting device 56 (depicted in FIG. 3) with respect to the reading device 54 (depicted in FIG. 3). Accordingly, a simple operation of attaching the shield member 42 to the housing 41 can generate uniform illuminance distribution in the sub-scanning direction in the irradiation region W1 to cause the position of the peak amount of light in the illuminance distribution to correspond to the center of the CCD 63 (depicted in FIG. 3). Consequently, the CCD 63 can read a bright image.

The shield member 42 is detachably attached to the housing 41, so that a user can access the reading device 54 easily to perform maintenance on the reading device 54.

The opposed surface 42A of the shield member 42 forms the bottom portion of the lighting device 56, and the protrusions 67 for engaging the grooves 66 of the housing 41, respectively, are provided at both ends of the shield member 42 in the direction A, that is, the main scanning direction, so as to position the lighting device 56 with respect to the reading device 54 while preventing the LED unit 44 (depicted in FIG. 3) from tilting in the sub-scanning direction. Thus, a simple operation of attaching the shield member 42 to the housing 41 can cause the position of the peak amount of light in the illuminance distribution in the irradiation region W1 to correspond to the center of the CCD 63. Consequently, the CCD 63 can read a bright image.

According to the above-described example embodiment, the shield member 42 is fixed to the housing 41 by the bolt 71 depicted in FIG. 13. Alternatively, the shield member 42 may be attached to the housing 41 via an engaging member.

Figure 14:
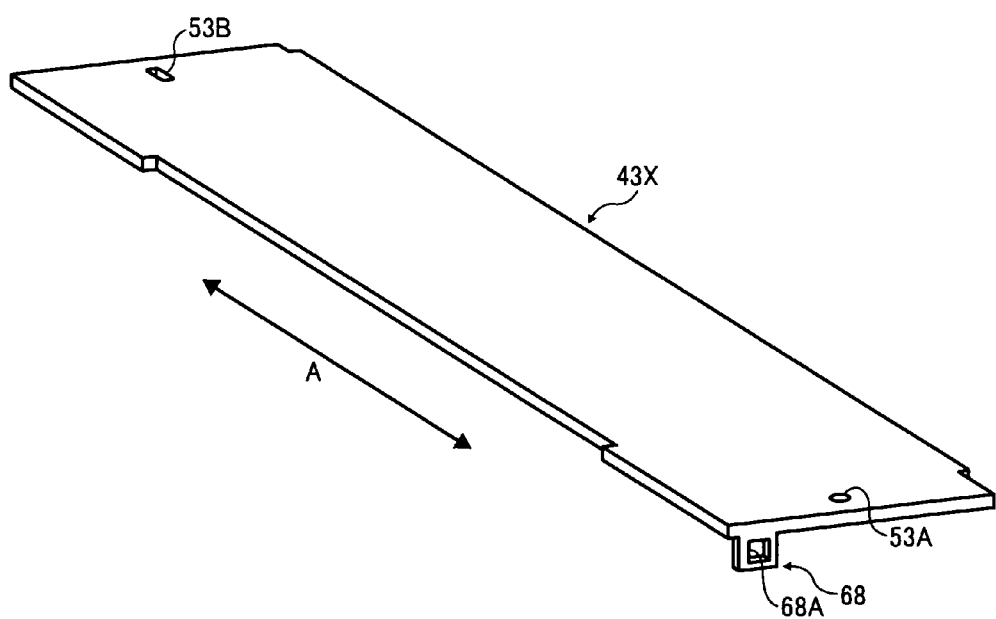
FIG. 14 is a perspective top view of a cover according to another example embodiment.
Figure 15:
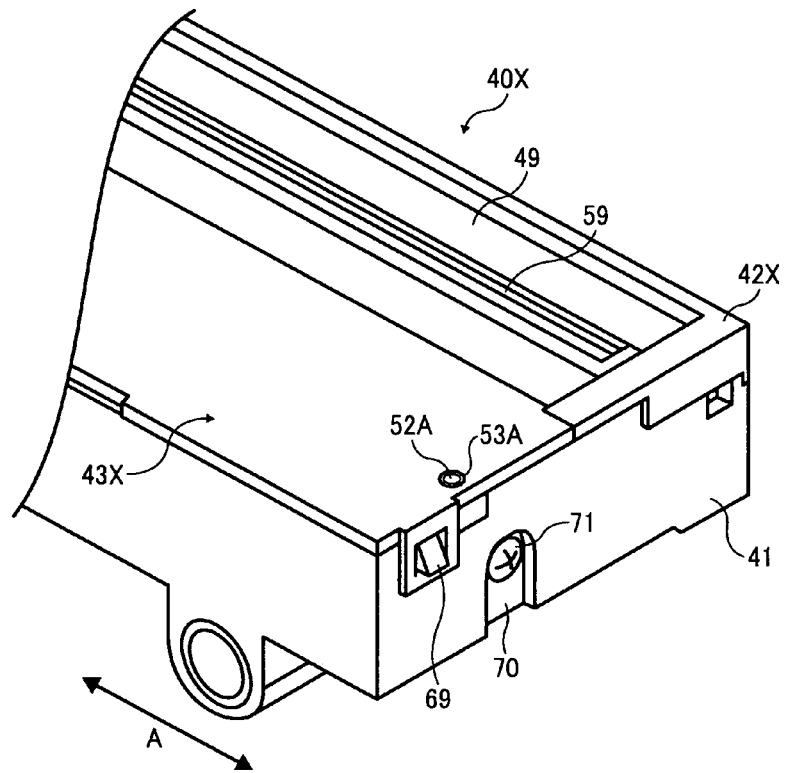
FIG. 15 is a partially perspective view (according to an example embodiment) of an optical scanning unit including the cover shown in FIG. 14.

Referring to FIGS. 14 and 15, the following describes an optical scanning unit 40X including such engaging member. FIG. 14 is a perspective top view of a cover 43X included in the optical scanning unit 40X. As illustrated in FIG. 14, the cover 43X includes an engaging member 68. The engaging member 68 includes an engaging hole 68A. FIG. 15 is a partially perspective view of the optical scanning unit 40X. As illustrated in FIG. 15, the optical scanning unit 40X includes a shield member 42X. The shield member 42X includes a protrusion 69.

As illustrated in FIG. 14, the engaging members 68 are provided at both ends of the cover 43X serving as a first sandwiching member in the direction A, that is, the main scanning direction. The engaging hole 68A is provided in the engaging member 68. As illustrated in FIG. 15, the protrusions 69 are provided at both ends of the shield member 42X serving as a second sandwiching member in the direction A, that is, the main scanning direction. When the protrusions 69 engage the engaging holes 68A of the engaging members 68, respectively, the cover 43X is attached to the shield member 42X. The shield member 42X is attached to the housing 41 by the bolt 71. Thus, the cover 43X and the shield member 42X are attached to the housing 41.

Accordingly, the groove 70 and the bolt hole 72 (depicted in FIG. 8) may not be needed to attach the shield member 42X to the housing 41. Namely, when the cover 43X is fixed to the housing 41 by the engaging member 68 and the protrusion 69 engaging the engaging member 68, the shield member 42X may be fixed to the housing 41 by the cover 43X.

Alternatively, a snap-fit may fix the shield member 42 and the cover 43 to the housing 41 depicted in FIG. 3. Yet alternatively, after the cover 43 is pushed into the shield member 42, the shield member 42 may be pushed into the housing 41. Yet alternatively, after the cover 43 is attached to the shield member 42, the shield member 42 may be fixed to the housing 41 by a pin, or the shield member 42 may be hooked on the housing 41.

According to the above-described example embodiments, the shield member 42 divides the inside of the housing 41 into the first space 57 and the second space 58. Alternatively, the shield member 42 may be provided on an upper open end of the housing 41. For example, the shield member 42 may serve as a lid for providing a space, in which the reading device 54 is provided, inside the housing 41.

Figure 16:
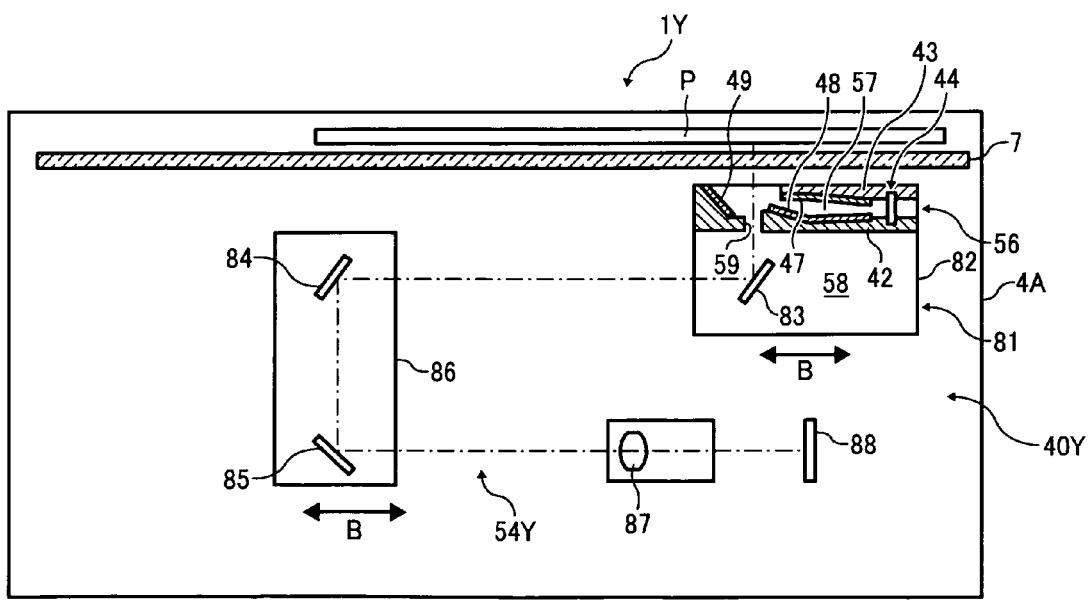
FIG. 16 is a schematic view of an image forming apparatus according to yet another example embodiment.

Referring to FIG. 16, the following describes an image forming apparatus 1Y according to another example embodiment. FIG. 16 is a schematic view of the image forming apparatus 1Y. The image forming apparatus 1Y includes an optical scanning unit 40Y. The optical scanning unit 40Y includes a reading device 54Y instead of the reading device 54 depicted in FIG. 3. The optical scanning unit 40Y further includes a reflection mirror 83. The other elements of the image forming apparatus 1Y are equivalent to the elements of the image forming apparatus 1 depicted in FIG. 3. As illustrated in FIG. 16, the reading device 54Y includes a first moving body 81, a housing 82, reflection mirrors 84 and 85, a second moving body 86, an image forming lens 87, and/or a CCD (charge-coupled device) 88.

In the image reader 4 (depicted in FIG. 1) of the image forming apparatus 1Y, the optical scanning unit 40Y is provided inside the housing 4A. The first moving body 81 moves in the direction B, that is, the sub-scanning direction, at a constant speed. The second moving body 86 also moves in the direction B, that is, the sub-scanning direction, at a half speed of the first moving body 81. The image forming lens 87 and the CCD 88 are fixed to the housing 4A.

In the first moving body 81, the lighting device 56, which is identical to the lighting device 56 provided in the image forming apparatus 1 depicted in FIG. 3, is detachably attached to the housing 82. The shield member 42 divides an inside of the housing 82 into the first space 57, in which the LED unit 44 is provided, and the second space 58, in which the reflection mirror 83 is provided. The second space 58 is provided under the first space 57. In other words, the shield member 42 separates the lighting device 56 from the reflection mirror 83 in such a manner that the second space 58 containing the reflection mirror 83 is provided inside the housing 82.

Reflection light reflected by an original document sheet P is guided from the first space 57 to the second space 58 through the slit 59, and is reflected by the reflection mirror 83. The reflection mirrors 84 and 85 are provided in the second moving body 86, and reflect the light reflected by the reflection mirror 83 toward the image forming lens 87.

The image forming lens 87 forms the light reflected by the reflection mirror 85 into an image in the CCD 88 serving as an image pickup device. The CCD 88 is disposed at a position at which the light traveling through the image forming lens 87 forms an image, and reads the image. The reflection mirrors 84 and 85, the image forming lens 87, and the CCD 88 serve as the reading device 54Y.

According to this example embodiment, the shield member 42 divides the inside of the housing 82 into the first space 57, in which the LED unit 44 is provided, and the second space 58, in which the reflection mirror 83 is provided. The slit 59 provided in the shield member 42 guides reflection light reflected by an original document sheet P from the first space 57 to the second space 58. Thus, the shield member 42 provides an optical path for guiding the reflection light reflected by the original document sheet P to the reflection mirror 83, and optically shields the reflection mirror 83 from the lighting device 56.

Accordingly, the shield member 42 can prevent or reduce emission light entering from the LED unit 44 to the reflection mirror 83. In other words, the shield member 42 can prevent or reduce emission light (e.g., flare light), other than the reflection light reflected by the original document sheet P, entering the reflection mirror 83. Consequently, the CCD 88 can read a bright image.

According to this example embodiment, the shield member 42 divides the inside of the housing 82 into the first space 57 and the second space 58. Alternatively, the shield member 42 may be provided on an upper open end of the housing 82. For example, the shield member 42 may serve as a lid for providing a space, in which the reflection mirror 83 is provided, inside the housing 82.

According to the above-described example embodiments, a lighting device (e.g., the lighting device 56 depicted in FIGS. 3 and 16), a reading device (e.g., the reading device 54 depicted in FIG. 3 or the reading device 54Y depicted in FIG. 16), and an image forming apparatus (e.g., the image forming apparatus 1 depicted in FIG. 3 or the image forming apparatus 1Y depicted in FIG. 16) can suppress or reduce fluctuation in illuminance distribution in the sub-scanning direction in an irradiation region (e.g., the irradiation region W1 depicted in FIG. 3), maintaining a stable amount of light supplied to the irradiation region while providing improved efficiency of maintenance of the lighting device. The above-described example embodiments can be applied to a lighting device for emitting light to an original document sheet, a reading device used in a copier, a facsimile machine, an image scanner, or the like including the lighting device, an image forming apparatus including the reading device, or the like.

For example, the lighting device includes a light source (e.g., the LED unit 44 depicted in FIG. 3), a first sandwiching member (e.g., the cover 43 depicted in FIG. 3 or the cover 43X depicted in FIG. 15), a second sandwiching member (e.g., the shield member 42 depicted in FIG. 3 or the shield member 42X depicted in FIG. 15), a reflection member (e.g., the reflection members 47 to 49 depicted in FIG. 3), and/or a positioning member (e.g., the grooves 50 and 51 depicted in FIG. 3). The first sandwiching member and the second sandwiching member sandwich the light source. The reflection member is provided on a first opposed surface (e.g., the opposed surface 43B depicted in FIG. 3) of the first sandwiching member and a second opposed surface (e.g., the opposed surface 42A depicted in FIG. 3) of the second sandwiching member opposing the first opposed surface. The reflection member reflects emission light emitted by the light source toward an irradiation region (e.g., the irradiation region W1 depicted in FIG. 3) on an original document sheet (e.g., the original document sheet P depicted in FIG. 3).

The light source is detachably attached to the first sandwiching member and the second sandwiching member. The positioning member is provided in the first opposed surface of the first sandwiching member and the second opposed surface of the second sandwiching member to position the light source with respect to the reflection member.

Alternatively, the light source may include a board (e.g., the LED board 45 depicted in FIG. 3) mounting a plurality of light emitting elements (e.g., the LED packages 46 depicted in FIG. 4) aligned substantially straight in the main scanning direction. The first sandwiching member and the second sandwiching member may sandwich the board of the light source. The lighting device may include, instead of the positioning member, a concave member (e.g., the grooves 50 and 51) provided in the first opposed surface of the first sandwiching member and the second opposed surface of the second sandwiching member to engage the board of the light source.

With the above-described structure, the reflection member reflects emission light emitted by the light source toward the irradiation region on the original document sheet. The light source is detachably attached to the first sandwiching member and the second sandwiching member. The positioning member is provided in the first opposed surface of the first sandwiching member and the second opposed surface of the second sandwiching member to position the light source with respect to the reflection member. Accordingly, fluctuation in illuminance distribution in the irradiation region can be suppressed or reduced in the sub-scanning direction, maintaining a stable amount of light supplied to the irradiation region.

The light source is detachably attached to the positioning member provided in the first sandwiching member and the second sandwiching member on which the reflection member is provided. Accordingly, the lighting device is disassembled and assembled to clean or replace the reflection member and the light source, providing improved efficiency of maintenance.

Further, the lighting device includes the light source, the first sandwiching member, and the second sandwiching member independently provided from each other. The light source is positioned with respect to the first sandwiching member and the second sandwiching member in such a manner that the first sandwiching member and the second sandwiching member sandwich the light source, so as to assemble the lighting device. Accordingly, the first sandwiching member and the second sandwiching member can be molded easily, improving productivity of the lighting device.

The light source includes the plurality of light emitting elements aligned substantially straight in the main scanning direction. Accordingly, the plurality of light emitting elements is positioned with respect to the reflection member provided on the first sandwiching member and the second sandwiching member in such a manner that the plurality of light emitting elements is parallel to the main scanning direction. Thus, the light source and the reflection member can be provided at a proper position with respect to the irradiation region. Consequently, fluctuation in the illuminance distribution in the irradiation region can be suppressed or reduced in the sub-scanning direction, maintaining a stable amount of light supplied to the irradiation region.

In the lighting device, the first sandwiching member is detachably attached to the second sandwiching member. An opening (e.g., the opening 43A), through which emission light emitted by the light source passes to irradiate the original document sheet, is provided between the first sandwiching member and the second sandwiching member. The first sandwiching member serves as a cover for shielding the light source from an outside of the lighting device.

Thus, the lighting device has a simple structure which can reduce manufacturing costs of the lighting device. A user can remove the cover from a housing of the lighting device to access the light source and the reflection member to perform maintenance of the lighting device easily.

The positioning member extends in the main scanning direction, and serves as grooves for engaging the light source.

Thus, the light source is aligned substantially straight with respect to the reflection member in the main scanning direction. Accordingly, the light source and the reflection member can be provided at a proper position with respect to the irradiation region. Consequently, fluctuation in the illuminance distribution in the irradiation region can be suppressed or reduced in the sub-scanning direction, maintaining a stable amount of light supplied to the irradiation region.

Further, the light source engages the grooves to cause the first sandwiching member and the second sandwiching member to sandwich the light source, so as to position the light source with respect to the reflection member, improving efficiency in positioning the light source.

An optical scanning unit (e.g., the optical scanning unit 40 depicted in FIG. 3, the optical scanning unit 40X depicted in FIG. 15, or the optical scanning unit 40Y depicted in FIG. 16) includes the lighting device, the reading device, and/or a housing (e.g., the housing 41 depicted in FIG. 3). The lighting device is detachably attached to the housing. The reading device is provided inside the housing, and reads reflection light reflected by the original document sheet. The housing houses the reading device and is movable in the sub-scanning direction. The second sandwiching member separates the reading device from the lighting device to form a space for the reading device inside the housing. An elongate slit (e.g., the slit 59 depicted in FIGS. 3, 15, and 16) is provided in the second sandwiching member in such a manner that the slit extends in the main scanning direction to guide reflection light reflected by the original document sheet to the space for the reading device.

Thus, the slit provides an optical path for guiding the reflection light reflected by the original document sheet to the reading device to optically shield the reading device from the lighting device.

In other words, the second sandwiching member prevents or reduces emission light, which is emitted by the light source, entering the reading device. Namely, the second sandwiching member prevents or reduces emission light (e.g., flare light), other than reflection light reflected by the original document sheet, entering the reading device. Accordingly, the reading device can read a bright image.

The reading device includes a plurality of reflection mirrors (e.g., the reflection mirrors 60A to 60E depicted in FIG. 3 or the reflection mirrors 84 and 85 depicted in FIG. 16), an image forming lens (e.g., the image forming lens 61 depicted in FIG. 3 or the image forming lens 87 depicted in FIG. 16), and/or an image pickup device (e.g., the CCD 63 depicted in FIG. 3 or the CCD 88 depicted in FIG. 16).

The plurality of reflection mirrors reflects reflection light reflected by the original document sheet and guided to the space for the reading device through the slit. The image forming lens forms the light reflected by the reflection mirrors into an image. The image pickup device reads the image, and is provided at an image forming position at which the image forming lens forms the image.

Thus, an optical path for guiding the reflection light reflected by the original document sheet to the reading device is provided to optically shield the reading device from the lighting device.

For example, the second sandwiching member, serving as a shield member, prevents or reduces emission light, which is emitted by the light source, entering the reflection mirrors, the image forming lens, and the image pickup device. In other words, the second sandwiching member prevents or reduces emission light, other than the reflection light reflected by the original document sheet, entering the reading device.

The optical scanning unit may include a housing (e.g., the housing 82 depicted in FIG. 16) movable in the sub-scanning direction. At least a reflection mirror (e.g., the reflection mirror 83 depicted in FIG. 16) for reflecting reflection light reflected by an original document sheet toward a reading device (e.g., the reading device 54Y depicted in FIG. 16) for reading the reflection light reflected by the original document sheet is provided inside the housing. The second sandwiching member separates the reflection mirror from the lighting device to form a space for containing the reflection mirror inside the housing. The elongate slit extending in the main scanning direction to guide reflection light reflected by the original document sheet to the space containing the reflection mirror is provided in the second sandwiching member.

Thus, the slit provides the optical path for guiding the reflection light reflected by the original document sheet to the reflection mirror to optically shield the reflection mirror from the lighting device.

In other words, the second sandwiching member prevents or reduces emission light, which is emitted by the light source, entering the reflection mirror. Namely, the second sandwiching member prevents or reduces emission light (e.g., flare light), other than reflection light reflected by the original document sheet, entering the reflection mirror. Accordingly, the reading device can read a bright image.

An image reader (e.g., the image reader 4 depicted in FIG. 1) includes the optical scanning unit and/or a driver (e.g., the driver 40A depicted in FIG. 1) for moving the lighting device in the sub-scanning direction.

The image reader includes the lighting device which provides proper illuminance distribution for reading an image in the sub-scanning direction with improved precision as well as improved efficiency of maintenance of the lighting device.

The image forming apparatus includes the image reader and/or an image forming device (e.g., the image forming device 5 depicted in FIG. 1) for forming an image on a recording medium according to the light read by the reading device, that is, image data obtained by reading an image on an original document sheet with the reading device.

The image forming apparatus includes the image reader including the lighting device which suppresses or reduces fluctuation in the illuminance distribution in the sub-scanning direction in the irradiation region to maintain a stable amount of light supplied to the irradiation region and improve efficiency of maintenance of the lighting device.

The present invention has been described above with reference to specific example embodiments. Nonetheless, the present invention is not limited to the details of example embodiments described above, but various modifications and improvements are possible without departing from the spirit and scope of the present invention. It is therefore to be understood that within the scope of the associated claims, the present invention may be practiced otherwise than as specifically described herein. For example, elements and/or features of different illustrative example embodiments may be combined with each other and/or substituted for each other within the scope of the present invention.

What is claimed is:
1. A lighting device, comprising:
a light source to emit light;
a first sandwiching member including a first opposed surface;
a second sandwiching member including a second opposed surface opposing the first opposed surface of the first sandwiching member,
the first sandwiching member and the second sandwiching member sandwiching the light source in such a manner that the light source is detachably attached to the first sandwiching member and the second sandwiching member;
at least one reflection member provided on each of the first opposed surface of the first sandwiching member and the second opposed surface of the second sandwiching member to reflect the light emitted by the light source toward an irradiation region on an original document sheet; and a positioning member provided in the first opposed surface of the first sandwiching member and the second opposed surface of the second sandwiching member to position the light source with respect to the reflection members.

2. The lighting device according to claim 1, wherein the light source comprises a plurality of light emitting elements aligned substantially straight in a main scanning direction to emit light and wherein the second opposed surface of the second sandwiching member opposes the first opposed surface of the first sandwiching member across a gap through which the light emitted by the plurality of light emitting elements and reflected by the at least one reflection member is guided toward the irradiation region on the original document sheet.

3. The lighting device according to claim 1, further comprising:

an opening provided between the first sandwiching member and the second sandwiching member, through which the light emitted by the light source passes to irradiate the original document sheet, wherein the first sandwiching member is detachably attached to the second sandwiching member, and comprises a cover to shield the light source from an outside of the lighting device.

4. The lighting device according to claim 1, wherein the positioning member comprises grooves extending in a main scanning direction to engage the light source.

5. An optical scanning unit including the lighting device according to claim 1, the optical scanning unit further comprising:

a reading device to read light reflected by the original document sheet; and a housing that houses the reading device and is movable in a sub-scanning direction, to which the lighting device is detachably attached, wherein the second sandwiching member separates the reading device from the lighting device to form a space for the reading device inside the housing, and wherein the second sandwiching member includes a slit extending in a main scanning direction to guide the light reflected by the original document sheet to the space for the reading device.

6. The optical scanning unit according to claim 5, wherein the reading device comprises:

a plurality of reflection mirrors to reflect the light reflected by the original document sheet and guided to the space for the reading device through the slit;

an image forming lens to form the light reflected by the plurality of reflection mirrors into an image; and an image pickup device to read the image, provided at a position at which the image forming lens forms the image.

7. An image reader including the optical scanning unit according to claim 5, the image reader further comprising a driver to move the lighting device in the sub-scanning direction.

8. An image forming apparatus including the image reader according to claim 7, the image forming apparatus further comprising an image forming device to form an image on a recording medium according to the light read by the reading device.

9. An optical scanning unit including the lighting device according to claim 1, the optical scanning unit further comprising:

a reading device to read light reflected by the original document sheet;

a reflection mirror to reflect the light reflected by the original document sheet toward the reading device; and a housing movable in a sub-scanning direction, inside which the reflection mirror is provided, wherein the second sandwiching member separates the reflection mirror from the lighting device to form a space for the reflection mirror inside the housing, and wherein the second sandwiching member includes a slit extending in a main scanning direction to guide the light reflected by the original document sheet to the space for the reflection mirror.

10. A lighting device, comprising:

a light source to emit light, comprising a board mounting a plurality of light emitting elements aligned substantially straight in a main scanning direction;

a first sandwiching member including a first opposed surface;

a second sandwiching member including a second opposed surface opposing the first opposed surface of the first sandwiching member, the first sandwiching member and the second sandwiching member sandwiching the board of the light source in such a manner that the light source is detachably attached to the first sandwiching member and the second sandwiching member;

at least one reflection member provided on each of the first opposed surface of the first sandwiching member and the second opposed surface of the second sandwiching member to reflect the light emitted by the light source toward an irradiation region on an original document sheet; and a concave member provided in the first opposed surface of the first sandwiching member and the second opposed surface of the second sandwiching member to engage the board of the light source.

11. The lighting device according to claim 10, further comprising:

an opening provided between the first sandwiching member and the second sandwiching member, through which the light emitted by the light source passes to irradiate the original document sheet, wherein the first sandwiching member is detachably attached to the second sandwiching member, and comprises a cover to shield the light source from an outside of the lighting device.

12. The lighting device according to claim 10, wherein the concave member comprises grooves extending in the main scanning direction to engage the light source.

13. An optical scanning unit including the lighting device according to claim 10, the optical scanning unit further comprising:

a reading device to read light reflected by the original document sheet; and a housing that houses the reading device and is movable in a sub-scanning direction, to which the lighting device is detachably attached, wherein the second sandwiching member separates the reading device from the lighting device to form a space for the reading device inside the housing, and wherein the second sandwiching member includes a slit extending in the main scanning direction to guide the light reflected by the original document sheet to the space for the reading device.

14. The optical scanning unit according to claim 13, wherein the reading device comprises:
- a plurality of reflection mirrors to reflect the light reflected by the original document sheet and guided to the space for the reading device through the slit;
- an image forming lens to form the light reflected by the plurality of reflection mirrors into an image; and
- an image pickup device to read the image, provided at a position at which the image forming lens forms the image.

15. An image reader including the optical scanning unit according to claim 13, the image reader further comprising a driver to move the lighting device in the sub-scanning direction.

16. An image forming apparatus including the image reader according to claim 15, the image forming apparatus further comprising an image forming device to form an image on a recording medium according to the light read by the reading device.

17. An optical scanning unit including the lighting device according to claim 10, the optical scanning unit further comprising:
- a reading device to read light reflected by the original document sheet;
- a reflection mirror to reflect the light reflected by the original document sheet toward the reading device; and
- a housing movable in a sub-scanning direction, inside which the reflection mirror is provided,
- wherein the second sandwiching member separates the reflection mirror from the lighting device to form a space for the reflection mirror inside the housing, and
- wherein the second sandwiching member includes a slit extending in the main scanning direction to guide the light reflected by the original document sheet to the space for the reflection mirror.

18. A lighting device, comprising: means for emitting light;
- first and second means for sandwiching the means for emitting, the first means for sandwiching the means for emitting including a first opposed surface and the second means for sandwiching the means for emitting including a second opposed surface opposing the first opposed surface of the first means for sandwiching the means for emitting,
- the means for emitting being detachably attached to the first and second means for sandwiching the means for emitting;
- a plurality of means for reflecting the light emitted by the means for emitting toward an irradiation region on an original document sheet, at least one of the plurality of means for reflecting provided on each of the first opposed surface of the first means for sandwiching and the second opposed surface of the second means for sandwiching; and
- means for positioning the means for emitting with respect to the means for reflecting, the means for positioning provided in the first opposed surface of the first means for sandwiching and the second opposed surface of the second means for sandwiching.

19. An image reader including the lighting device according to claim 18.

20. An image forming apparatus including the image reader according to claim 19.

* * * * *

UNITED STATES PATENT AND TRADEMARK OFFICE
CERTIFICATE OF CORRECTION

PATENT NO. : 8,339,682 B2  Page 1 of 1
APPLICATION NO. : 12/457276
DATED : December 25, 2012
INVENTOR(S) : Kazushige Kawamura et al.

It is certified that error appears in the above-identified patent and that said Letters Patent is hereby corrected as shown below:

Title Page, item (54) and in the Specification, column 1, lines 1-3, should read;

LIGHTING DEVICE FOR USE IN AN OPTICAL SCANNING UNIT OF AN IMAGE READER

Signed and Sealed this
Seventh Day of May, 2013

Teresa Stanek Rea
*Acting Director of the United States Patent and Trademark Office*